United States Patent
Brooks et al.

(10) Patent No.: US 8,806,237 B2
(45) Date of Patent: Aug. 12, 2014

(54) POWER SWITCH CONTROL CIRCUITRY ISOLATING OR COUPLING A SYSTEM POWER BUS OF A COMPUTER BASED ON A RESULT STATE OF A LOGICAL OPERATION

(75) Inventors: Robert C. Brooks, Houston, TX (US); Patrick L. Ferguson, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 314 days.

(21) Appl. No.: 13/387,633

(22) PCT Filed: Mar. 30, 2010

(86) PCT No.: PCT/US2010/029215
§ 371 (c)(1),
(2), (4) Date: Jan. 27, 2012

(87) PCT Pub. No.: WO2011/123097
PCT Pub. Date: Jun. 10, 2011

(65) Prior Publication Data
US 2012/0124397 A1    May 17, 2012

(51) Int. Cl.
*G06F 1/00* (2006.01)
*G06F 1/32* (2006.01)
*G06F 1/26* (2006.01)

(52) U.S. Cl.
CPC ... *G06F 1/26* (2013.01); *G06F 1/32* (2013.01)
USPC ............................. 713/300; 713/320; 713/324

(58) Field of Classification Search
CPC .................................................. G06F 1/3203
USPC .......................................................... 713/300
See application file for complete search history.

(56) References Cited

U.S. PATENT DOCUMENTS

| | | | |
|---|---|---|---|
| 5,525,891 A * | 6/1996 | Meyer et al. | 320/128 |
| 6,775,784 B1 | 8/2004 | Park | |
| 7,117,377 B2 | 10/2006 | Hagiwara et al. | |
| 7,334,141 B2 | 2/2008 | Allen et al. | |
| 7,518,885 B2 * | 4/2009 | Baurle et al. | 363/16 |
| 7,579,820 B2 * | 8/2009 | Hane | 323/288 |
| 8,135,944 B2 * | 3/2012 | Lassa et al. | 713/1 |
| 8,527,797 B2 * | 9/2013 | Kong et al. | 713/324 |
| 2007/0266266 A1 | 11/2007 | Dubinsky et al. | |
| 2008/0168288 A1 | 7/2008 | Jia et al. | |
| 2009/0199026 A1 | 8/2009 | Kimmel et al. | |

FOREIGN PATENT DOCUMENTS

| CN | 200941186 | 8/2007 |
|---|---|---|
| CN | 101441505 | 5/2009 |

* cited by examiner

*Primary Examiner* — Suresh Suryawanshi

(57) ABSTRACT

Electronic circuits and methods are provided for conserving power within computers and other apparatus. A logic circuit performs a logical operation on a plurality of variables thus deriving a corresponding output. The output is used to drive and maintain an open or closed state of an electronic switch, accordingly. The electronic switch is disposed between a source of electrical energy and a system power buss of a computer. The computer can assume very low power, full power and other respective operating modes in accordance with the present state of the electronic switch.

15 Claims, 4 Drawing Sheets

POWER SWITCH CONTROL CIRCUITRY ISOLATING OR COUPLING A SYSTEM POWER BUS OF A COMPUTER BASED ON A RESULT STATE OF A LOGICAL OPERATION

BACKGROUND

Numerous desktop computers and other devices are designed to assume one or more types of low power-consumption mode during non-use or other idle periods. Applicable laws and regulations in this area are becoming more stringent as the need to conserve resources is recognized as essential to a sustainable global community. Appropriate circuits, devices and methods are needed in order to conform to present or pending power conservation directives. The present teachings address the foregoing concerns.

BRIEF DESCRIPTION OF THE DRAWINGS

The present embodiments will now be described, by way of example, with reference to the accompanying drawings, in which:

FIG. 3 is a schematic diagram depicting electronic switch circuitry according to one embodiment;

DETAILED DESCRIPTION

Introduction

Electronic circuits and methods are provided for conserving power within computers and other apparatus. A logic circuit performs a logical operation on a plurality of variables so as to derive a corresponding output. The output is used to drive and maintain an open or closed state of an electronic switch, accordingly. The electronic switch is disposed so as to couple a source of electrical energy to a system power buss of a computer when in the closed state. The computer can assume very low power, full power and other respective operating modes according to the present state of the electronic switch.

In one embodiment, an apparatus includes an electronic switch configured to couple a system power buss to a source of electrical potential in accordance with a control signal. The apparatus also includes a control circuit configured to drive the control signal in accordance with a logical operation on a plurality of variables. At least some of the variables respectively correspond to a present state of a manual switch, a power rail status signal, an input/output signal of a computer system board, a sleep-state signal of a computer, and the control signal.

In another embodiment, a method is performed at least in part by an electronic circuit. The method includes performing a logical operation on at least five variables. The method also includes electrically isolating a system power buss of a computer from a source of electrical potential in accordance with a first result state of the logical operation. The method further includes electrically coupling the system power buss of the computer to the source of electrical potential in accordance with a second result state of the logical operation.

First Illustrative Computer

Figure 1:
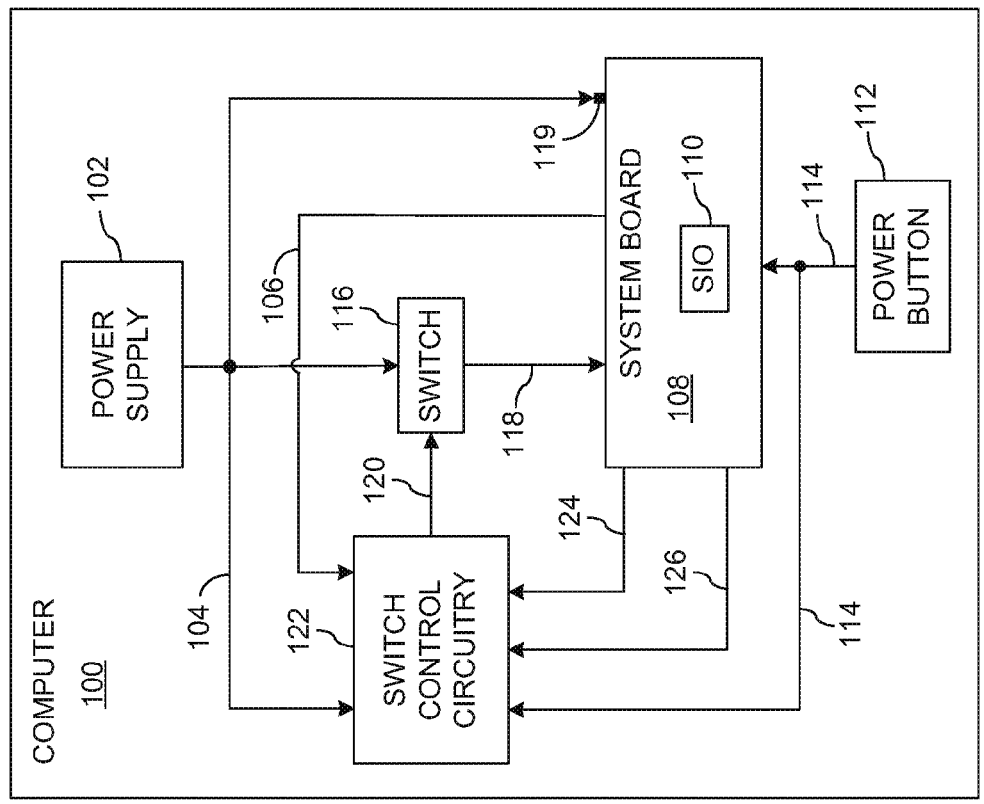
FIG. 1 depicts a block diagram of a computer according to one embodiment.

Reference is now directed to FIG. 1, which depicts a block diagram of a computer 100. The computer 100 is illustrative and non-limiting with respect to the present teachings. Thus, other computers, devices and systems can be configured and/or operated in accordance with the present teachings. Additionally, one of ordinary skill in the computer and related arts will appreciate that the computer 100 can include numerous other resources and features that are not depicted in the interest of clarity.

The computer 100 includes a power supply 102. The power supply 102 is configured to receive power from a source (not shown) such as line utility voltage and to provide a plurality of regulated output voltages. As depicted, the power supply 102 provides a regulated output voltage at a node 104. The potential at node 104 is designated "power supply buss" or "PS_BUSS" for purposes herein. The electrical output at node 104 is provided by the power supply 102 whenever the computer 100 is coupled to an external source of electrical energy (e.g., line utility voltage, etc.).

The computer 100 also includes a system board 108. The system board 108 includes a super input/output (S10) controller 110. The system board 108 can also include numerous other resources (not shown) such as, for non-limiting example, one or more microprocessors or microcontrollers, data storage, memory, a state machine, digital/analog/hybrid circuitry, etc. Other resources can also be present. The system board 108 is configured to receive electrical energy from the power supply buss node 104 as described in further detail below. The system board 108 is also configured to provide power at a node 106. The signal at the node 106 is designated "power rail" or "PWR_RAIL" for purposes herein.

For purposes of non-limiting illustration, it is assumed that the PS_BUSS output at node 104 is twelve volts direct-current (DC), while the PWR_RAIL at the node 106 is three-point-three volts DC. Other voltages can also be present or used. For purposes of clarity, a single power supply 102 providing a single regulated PS_BUSS output at the node 104 is depicted. However, it is to be understood that the present teachings contemplate other embodiments in which additional regulated voltages (e.g., five volts, minus twelve volts, etc.) are present, or plural power supplies or batteries or other energy sources are used. In one alternative embodiment, the PWR_RAIL output at the node 106 is provided by the power supply 102.

The computer 100 also includes a power button 112. In one embodiment, the power button 112 is a manually actuated, normally-open, momentary switch. The power button 112 is configured to provide an output signal at a node 114. The signal at node 114 is designated "PWRBTTN#" for purposes herein. In one embodiment, the signal at node 114 is biased high (i.e., toward positive potential) when the power button 112 is not pressed, and biased low (i.e., toward ground potential) when the power button is being pressed by a user. Other signaling or actuation schemes can also be used.

The computer 100 also includes an electronic switch 116. The electronic switch 116 is electrically disposed between the power supply buss (node 104) and a system power buss (node 118). The system power buss 118 is also designated "SYSPWR_BUSS" for purposes herein. The electronic switch 116 is configured to electrically couple and de-couple the system power buss 118 to electrical energy at the node 104 in accordance with control signaling at a node 120. The control signal at the node 120 is also designated "VLPS_ON" for purposes herein.

The system board 108 is also coupled to receive electrical energy from the power supply buss 104 by way of a low-power node 119. Electrical energy at the low power node 119 is used to power relatively low current-demand loads and resources of the system board 108 such as, for non-limiting example. CMOS memory. Other low current-demand loads can also be served by way of the low-power node 119.

The computer 100 further includes switch control circuitry 122. The switch control circuitry 122 is configured to drive (i.e., assert and de-assert) the control signal at the node 120 in accordance with a logical operation that is described in detail hereinafter. The switch control circuitry 122 is coupled to electrical energy at the node 104, electrical energy at the node 106 and the power button signal at the node 114. For purposes of clarity, the switch control circuitry 122 is depicted as separate and distinct from other features of the computer 100. However, the present teachings contemplate one or more embodiments in which the switch control circuitry 122 is provided, in whole or in part, by way of the system board 108.

The switch control circuitry 122 is also coupled to receive a general purpose input/output signal from the system board 108 by way of a node 124. The signal at the node 124 is designated "VLPS_GPIO" for purposes herein. The switch control circuitry 122 is also coupled to receive a sleep-state status signal from the system board 108 by way of a node 126. The signal at the node 126 is designated "SLP_S5#" for purposes herein. Other appropriate designations can be used in other respective embodiments.

General, normal operations of the computer 100—relevant to the present teachings—are as follows: The power supply 102 provides electrical power to the system board 108 by way of the node 104. The electronic switch 116 is understood to be in a closed condition (electrically conductive) when the computer 100 is capable of full-power operations. Electrical energy at the node 106 is also assumed to be present.

At some point in time, the computer 100 assumes a low power sleep-state and the signal at node 126 (SLP_S5#) is asserted (logic low). It is further assumed that the signal at node 124 (VLPS_GPIO) is asserted (logic high) in accordance with a user selection, a prior default system setting preserved in non-volatile memory, etc. At this time, the switch control circuitry 122 asserts and maintains the output signal (VLPS_ON) at node 120 (logic high). In turn, the electronic switch 116 is driven into an electrically open state.

The open state of the electronic switch 116 electrically isolates the node 118 (SYSPWR_BUSS) from the node 104 (PS_BUSS), effectively de-energizing the system power buss 118. Numerous resources (loads) of the system board 108 are no longer coupled to electrical power at the node 104. However, electrical power continues to be provided to low current-demand loads and resources by way of the node 119. The computer 100 now assumes a very low power state (VLPS). In some embodiments, the computer 100 consumes not more than one-half watt of electrical power while in the very low power state At some time thereafter, a user wishes to return the computer 100 to normal, full-power operations. The user then momentarily presses the power button 112, which causes the signal at node 114 (PWRBTTN#) to be asserted (logic low). In response, the switch control circuitry 122 de-asserts and maintains the output signal (VLPS_ON) at node 120 at logic low. The electronic switch 116 is thus driven into an electrically closed state. This closed state of the electronic switch 116 electrically couples node 118 to node 104, re-energizing the system power buss 118. The computer 100 is now capable of normal, full-power operations.

First Illustrative Circuitry

Figure 2:
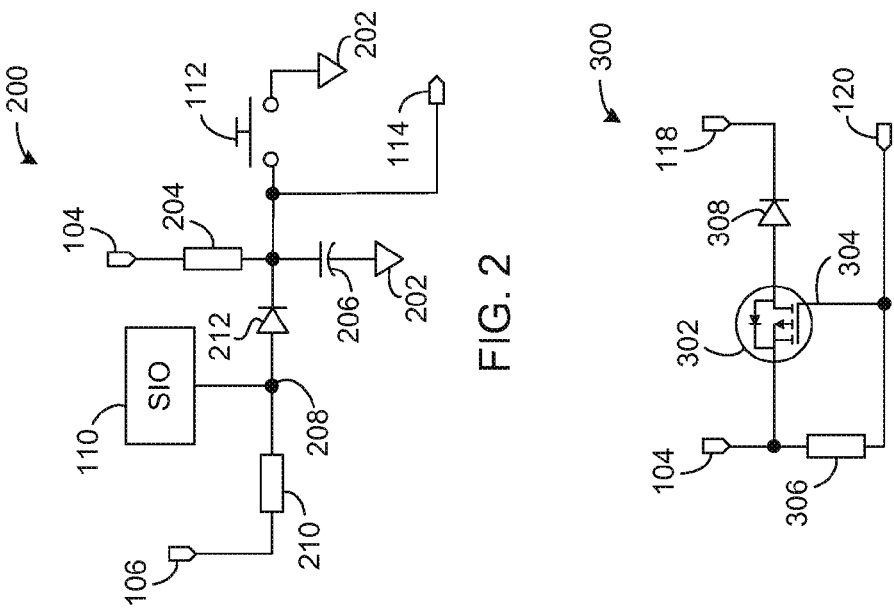
FIG. 2 is a schematic diagram depicting power button circuitry according to one embodiment.

FIG. 2 is a schematic diagram depicting power button circuitry (circuitry) 200 according to one embodiment. The circuitry 200 is illustrative and non-limiting with respect to the present teachings. Thus, other power button circuits can be configured or operated in accordance with the present teachings.

The circuitry 200 includes power button 112 as introduced above. Thus, the power button 112 a manual, normally-open, momentary-contact switch. The power button 112 is also referred to as a manual switch 112 for purposes herein. The power button 112 is coupled to ground potential at a node 202, and to the signal node 114. The circuitry 200 also includes a pull-up resistor 204 coupled between electrical power at the node 104 and the signal node 114. The pull-up resistor 204 operates to bias (logic high) the signal at node 114 (PWRBTTN#) when the manual switch 112 is in the normal, electrically open state. In turn, the signal at node 114 is pulled toward ground (logic low) when the manual switch 112 is in the actuated, electrically closed state.

The circuitry 200 also includes a capacitor 206 coupled to ground at node 202 and to the signal node 114. The capacitor 206 is configured to filter the signal at the node 114 during actuation of the manual switch 112. The circuitry 200 also includes a signal node 208 that is biased (logic high) by way of a resistor 210 and the electrical potential at the node 106. The circuitry further includes a diode 212 that couples the node 208 to the node 114. When the power button 112 is pressed, the node 208 is pulled toward ground potential (logic low) by forward-biased operation of the diode 212. Additionally, the diode 212 operates to isolate the super input-output 110 during VLPS.

The circuitry 200 is coupled to the super input-output 110 (as introduced above) by way of the node 208. The super input-output 110 receives a status signal at the node 208 corresponding to the actuated or non-actuated state of the manual switch 112. It is noted that the super input-output 110 is not energized during the very low power state (VLPS) introduced above. Table 1 below summarizes illustrative models and values for elements of the circuitry 200 according to one embodiment. One having ordinary skill in the electronic or related arts can appreciate that other embodiments having other respective values or models can also be used.

TABLE 1

Illustrative Power Button Circuitry 200

| Element/Device | Value/Model | Notes/Vendor |
| --- | --- | --- |
| Switch 112 | N.C. Momentary | (any vendor) |
| Resistor 204 | 200K Ohms | 5%/(any vendor) |
| Capacitor 206 | 1.0 uFarad | 50 VDC/(any vendor) |
| Resistor 210 | 8.2K Ohms | 5%/(any vendor) |
| Diode 212 | Schottky | (any vendor) |

Second Illustrative Circuitry

Attention is now directed to FIG. 3, which is a schematic diagram depicting electronic switch circuitry (circuitry) 300 according to one embodiment. The circuitry 300 is illustrative and non-limiting with respect to the present teachings. Thus, other electronic switch circuits can be configured or operated in accordance with the present teachings.

The circuitry 300 includes a power metal-oxide semiconductor field-effect transistor (MOSFET) 302. The MOSFET 302 includes a control node (i.e., gate) 304 that is configured to receive the output signal at the node 120. The control node 304 is also coupled to be biased toward the potential at the node 104 by way a resistor 306. The circuitry 300 also includes a diode 308 that is configured to couple another node of the MOSFET 302 to the node 118 (system power buss) by way of forward-biased operation.

The MOSFET 302 and the diode 308 electrically couple the system power buss 118 to electrical energy (e.g., twelve volts, etc.) at the node 104 when the control signal at the node 120 is de-asserted by the switch control circuitry 122. Table 2 below summarizes illustrative models and values for select elements of the circuitry 300 according to one embodiment. One having ordinary skill in the electronic or related arts can appreciate that other embodiments having other respective values or models can also be used.

TABLE 2

Illustrative Electronic Switch Circuitry 300

| Element/Device | Value/Model | Notes/Vendor |
|---|---|---|
| Transistor 302 | FDD6686 | Fairchild Semiconductor |
| Resistor 306 | 10K Ohms | 5%/(any vendor) |
| Diode 308 | B3408-13-F | (any vendor) |

Third Illustrative Circuitry

Figure 4:
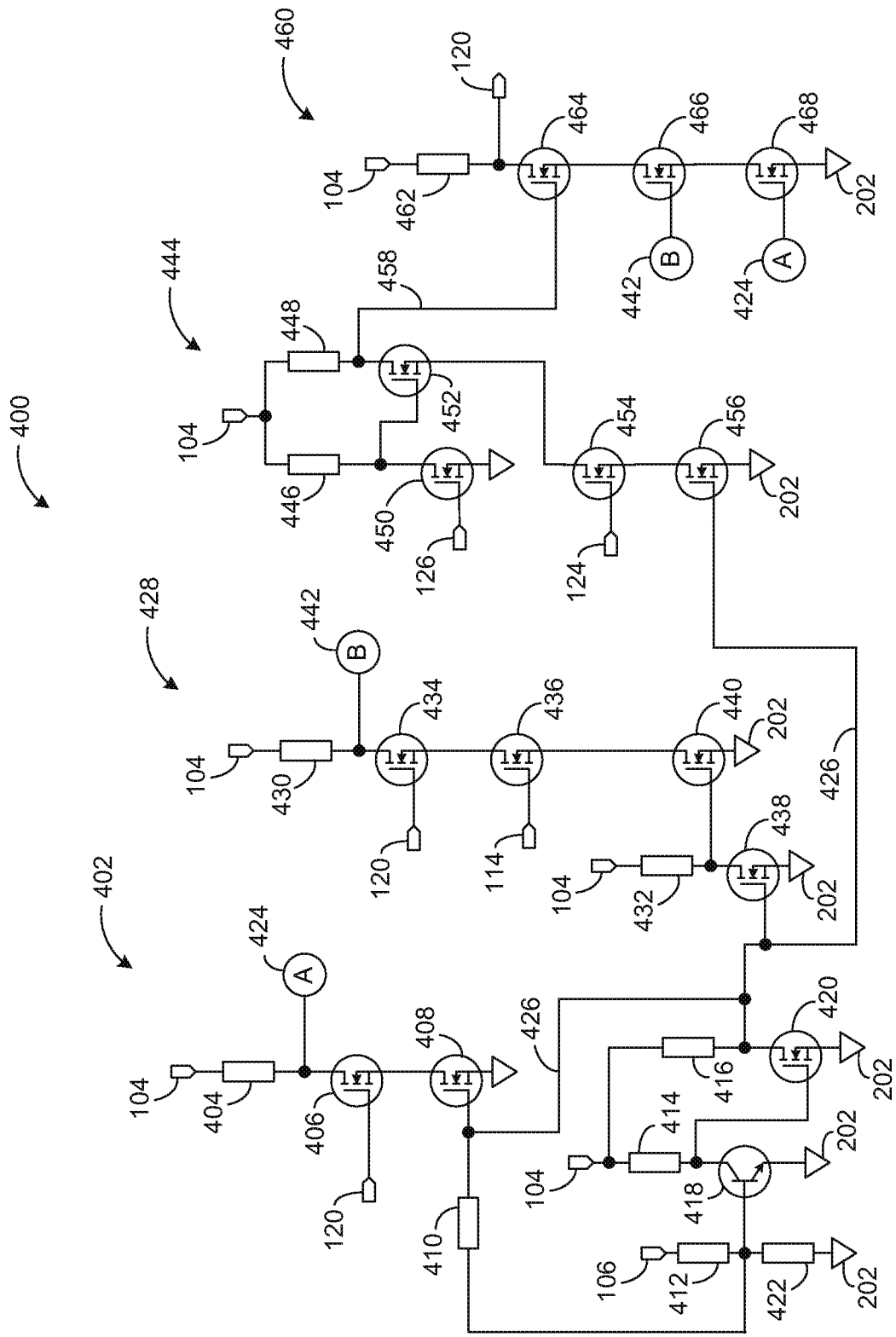
FIG. 4 is a schematic diagram depicting logic circuitry according to one embodiment.

Attention is now directed to FIG. 4, which is a schematic diagram depicting logic circuitry (circuitry) 400 according to one embodiment. The circuitry 400 is illustrative and non-limiting with respect to the present teachings. Thus, other logic circuits can be configured or operated in accordance with the present teachings. One having ordinary skill in the electronic and related arts will appreciate that the switch control circuitry 100 can be defined, at least in part, by the logic circuitry 400.

The circuitry 400 includes a circuit portion 402. The portion 402 includes respective resistors 404, 410, 412, 414, 416 and 422, The portion 402 also includes respective transistors 406, 408, 418 and 420. The portion 402 is configured to receive electrical potential at the node 104 (PS_BUSS) and the output signal at the node 120 (VLPS_ON). The portion 402 is further configured to receive electrical energy at the node 106 (PWR_RAIL).

The circuit portion 402 is also configured to provide an output signal at a node 424. The output signal at node 424 is designated "TERM_1" for purposes herein. The circuit portion 402 is further configured to provide a conditioned form of the node 106 energy at a node 426, The signal at the node 426 is designated "rail status" or "RAIL_STAT" for purposes herein.

The circuit portion 402 is configured to drive the output signal at the node 424 in accordance with the logical expression: TERM_1=NOT[(VLPS_ON) AND (RAIL_STAT)]. Thus, TERM_1 is de-asserted logic low (logic 0) when both VLPS_ON and RAIL_STAT are logic high. TERM_1 is asserted logic high (logic 1) in all other cases of VLPS_ON and RAIL_STAT.

Table 3 below summarizes illustrative models and values for select elements of the circuit portion 402 according to one embodiment. One having ordinary skill in the electronic or related arts can appreciate that other embodiments having other respective values or models can also be used.

TABLE 3

Illustrative Circuit Portion 402

| Element/Device | Value/Model | Notes/Vendor |
|---|---|---|
| Resistor 404 | 200K Ohms | 5%/(any vendor) |
| Transistor 406 | 2N7002 | Fairchild Semiconductor |
| Transistor 408 | 2N7002 | Fairchild Semiconductor |
| Resistor 410 | 2M Ohms | 5%/(any vendor) |
| Resistor 412 | 10K Ohms | 5%/(any vendor) |
| Resistor 414 | 200K Ohms | 5%/(any vendor) |
| Resistor 416 | 200K Ohms | 5%/(any vendor) |
| Transistor 418 | MBT3904DW1T1 | ON Semiconductor |
| Transistor 420 | 2N7002 | Fairchild Semiconductor |
| Resistor 422 | 13.3K Ohms | 5%/(any vendor) |

The circuitry 400 also includes a circuit portion 428. The portion 428 includes respective resistors 430 and 432. The portion 428 also includes respective transistors 434, 436, 438 and 440. The circuit portion 428 is configured to receive electrical potential (PS_BUSS) at the node 104 and the output signal (VLPS_ON) at the node 120. The portion 428 is further configured to receive the signal (PWRBTTN#) at the node 114, and the rail status signal (RAIL_STAT) at the node 426.

The circuit portion 428 is also configured to provide an output signal at a node 442. The output signal at node 442 is designated "TERM_2" for purposes herein. The circuit portion 428 is configured to drive the output signal at the node 442 in accordance with the logical expression: TERM_2=NOT[(VLPS_ON) AND (PWRBTTN#) AND (!RAIL_STAT)]. Thus, TERM_2 is de-asserted logic low when VLPS_ON and PWRBTTN# are both logic high and RAIL_STAT is logic low. TERM_2 is asserted logic high in all other cases of VLPS_ON. PWRBTTN# and RAIL_STAT. As used above and hereinafter, the symbol "!" refers to logical inversion (i.e., logical NOT operation).

Table 4 below summarizes illustrative models and values for select elements of the circuit portion 428 according to one embodiment. One having ordinary skill in the electronic or related arts can appreciate that other embodiments having other respective values or models can also be used.

TABLE 4

Illustrative Circuit Portion 428

| Element/Device | Value/Model | Notes/Vendor |
|---|---|---|
| Resistor 430 | 200K Ohms | 5%/(any vendor) |
| Resistor 432 | 200K Ohms | 5%/(any vendor) |
| Transistor 434 | 2N7002 | Fairchild Semiconductor |
| Transistor 436 | 2N7002 | Fairchild Semiconductor |
| Transistor 438 | 2N7002 | Fairchild Semiconductor |
| Transistor 440 | 2N7002 | Fairchild Semiconductor |

The circuitry 400 also includes a circuit portion 444. The portion 444 includes respective resistors 446 and 448. The portion 444 also includes respective transistors 450, 452, 454 and 456. The circuit portion 444 is configured to receive electrical potential (PS_BUSS) at the node 104 and the signal (VLPS_GPIO) at the node 124. The portion 444 is further configured to receive the signal (SLP_S5#) at the node 126, and the signal (RAIL_STAT) at the node 426.

The circuit portion 444 is also configured to provide an output signal at a node 458. The output signal at node 458 is designated "TERM_3" for purposes herein. The circuit portion 444 is configured to drive the output signal at the node 458 in accordance with the logical expression: TERM_3=NOT[(!SLP_S5#) AND (VLPS_GPIO) AND (RAIL_STAT)]. Thus, TERM_3 is de-asserted logic low when VLPS_GPIO and RAIL_STAT are both logic high and SLP_S5# is logic low. TERM_3 is asserted logic high in all other cases of LPS-GPIO, SLP_S5# and RAIL_STAT.

Table 5 below summarizes illustrative models and values for select elements of the circuit portion 444 according to one embodiment. One having ordinary skill in the electronic or related arts can appreciate that other embodiments having other respective values or models can also be used.

TABLE 5

Illustrative Circuit Portion 444

| Element/Device | Value/Model | Notes/Vendor |
| --- | --- | --- |
| Resistor 446 | 200K Ohms | 5%/(any vendor) |
| Resistor 448 | 200K Ohms | 5%/(any vendor) |
| Transistor 450 | 2N7002 | Fairchild Semiconductor |
| Transistor 452 | 2N7002 | Fairchild Semiconductor |
| Transistor 454 | 2N7002 | Fairchild Semiconductor |
| Transistor 456 | 2N7002 | Fairchild Semiconductor |

The circuitry 400 further includes a circuit portion 460. The portion 460 includes a resistor 462. The portion 460 also includes respective transistors 464, 466, 468. The circuit portion 460 is configured to receive electrical potential (PS_BUSS) at the node 104. The portion 460 is further configured to receive the signal (TERM_1) at the node 424, the signal (TERM_2) at the node 442 and the signal (TERM_3) at the node 458.

The circuit portion 460 is also configured to provide the output signal (VLPS_ON) at the node 120. The circuit portion 460 is configured to drive the output signal at the node 120 in accordance with the logical expression: VLPS_ON=NOT [(TERM_1) AND (TERM_2) AND (TERM_3)]. Thus, VLPS_ON is de-asserted logic low when TERM_1, and TERM_2 and TERM_3 are all logic high. VLPS_ON is asserted logic high in all other cases of TERM_1, TERM_2 and TERM_3. The immediate foregoing expression is equivalent to: VLPS_ON=NOT(TERM_1) OR NOT(TERM_2) OR NOT(TERM_3).

Thus, the full logical operation performed by the logic circuitry 400 is expressed as follows:

$$VLPS\_ON(next) = \quad \text{(Expression 1)}$$
$$(!\,SLP\_S5\# * VLPS\_GPIO * RAIL\_STAT) +$$
$$(VLPS\_ON * PWRBTTN\# *\,!\,RAIL\_STAT) +$$
$$(VLPS\_ON * RAIL\_STAT)$$

Wherein: !=Logical NOT; *=Logical AND; +=Logical OR

Table 6 below summarizes illustrative models and values for select elements of the circuitry portion 460 according to one embodiment. One having ordinary skill in the electronic or related arts can appreciate that other embodiments having other respective values or models can also be used.

TABLE 6

Illustrative Circuit Portion 460

| Element/Device | Value/Model | Notes/Vendor |
| --- | --- | --- |
| Resistor 462 | 200K Ohms | 5%/(any vendor) |
| Transistor 464 | 2N7002 | Fairchild Semiconductor |
| Transistor 466 | 2N7002 | Fairchild Semiconductor |
| Transistor 468 | 2N7002 | Fairchild Semiconductor |

In general, and without limitation, the logic circuitry 400 is configured to receive a plurality of signals by way of the respective nodes 106, 114, 120, 124 and 126, to derive a rail status signal at node 426, and to perform a logical operation on the respective signals. Thus, the signals at the nodes 426, 114, 120, 124 and 126 are treated as respective input logic variables by the circuitry 400. In turn, the logic circuitry 400 drives the output signal (VLPS_ON) at the node 120 in accordance with the logical operation. Thus, VLPS_ON is both an input variable and an output variable by virtue of signal feedback. The logic circuitry 400 exhibits a latching or "memory" characteristic and maintains the most recent logic state of VLPS_ON until such is changed in accordance with the logical operation.

It is noted that the logic circuitry 400 is comprised of discrete components. That is, the circuitry 400 does not include any integrated circuits, field-programmable gate array (FPGA), or other relatively complex devices. Furthermore, at least one embodiment of the logic circuitry 400 includes fourteen discrete transistors of the same model 2N7002, as available from Fairchild Semiconductor Inc., San Jose, Calif., USA. As a result, the logic circuit 400 is defined by a narrow scope of parts types, resulting in very low quiescent power consumption and economical implementation.

However, the present teachings also contemplate logic circuits embodied, at least in part, as an integrated logic device, an FPGA, an application-specific integrated circuit (ASIC), etc. Thus, other embodiments respectively defined and configured to perform the logical operation of circuit 400, are also within the scope of the present teachings.

First Illustrative Truth Table

Figure 5:
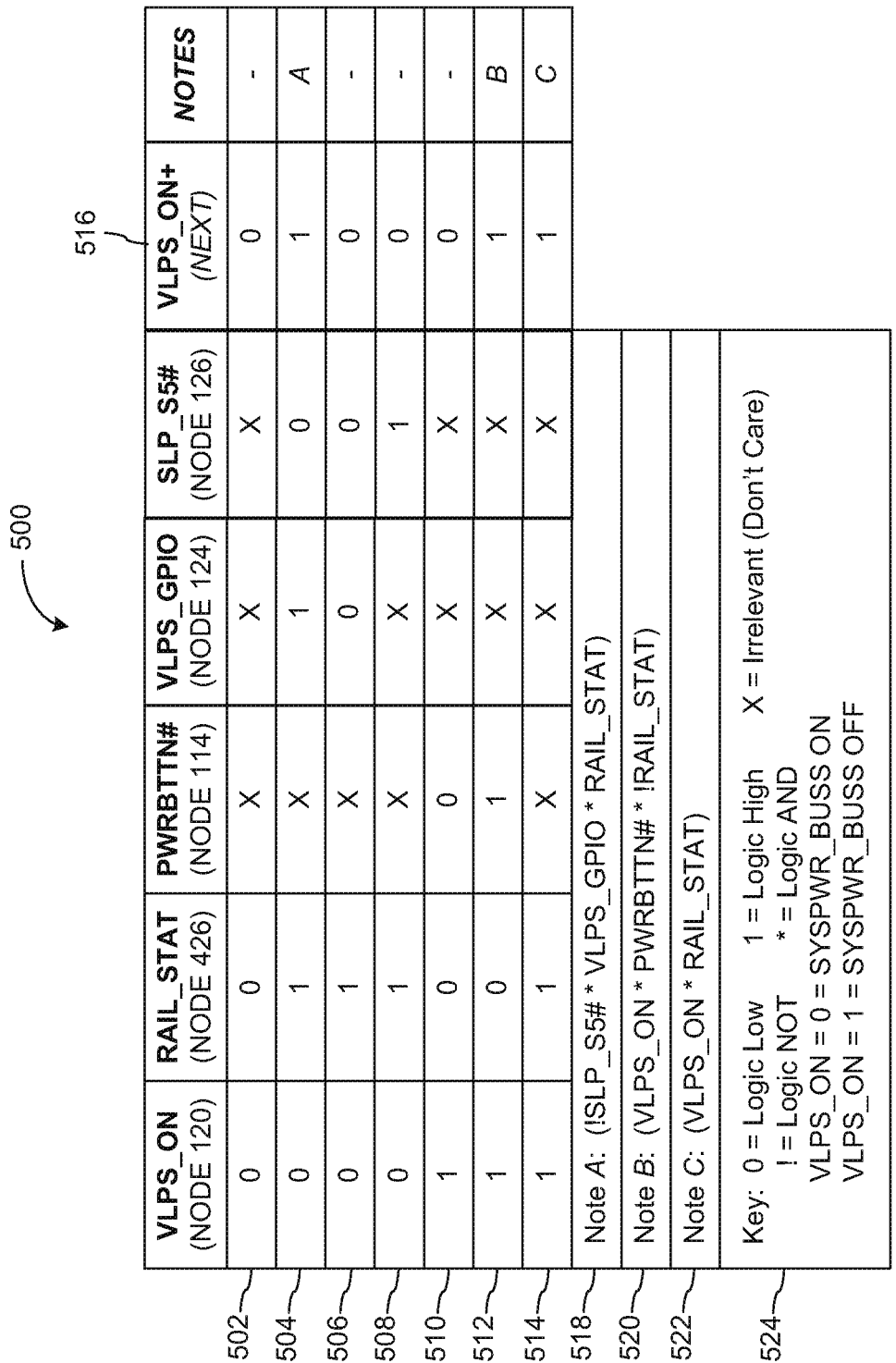
FIG. 5 is a truth table depicting a logic operation according to one embodiment.

FIG. 5 is a truth table 500 depicting a logic operation on a plurality of variables according to the present teachings. The truth table 500 corresponds to the logical operation of the circuitry 400. However, the present teachings contemplate other truth tables consistent with the operations and methods herein.

The rows 502-514, inclusive, of the truth table 500 depict various logic levels for signals (input variables) at the nodes 426, 114, 120, 124 and 126, respectively. The column 516 of the truth table 500 also depicts next state logic levels for the output signal (variable VLPS_ON) at the node 120 for each of the rows 502-514. The truth table 500 also includes notes 518, 520 and 522 respectively corresponding to rows 504, 512 and 514. The truth table 500 further includes an interpretive key 524.

It is noted that the output at the node 120 (VLPS_ON) assumes a logic high level for the input variable combinations of rows 504, 512 and 514. The output at the node 120 assumes a logic low level for the other input variable combinations of rows 502, 506, 508 and 510. The notes 518, 520 and 522 include respective logical operations (or expressions) resulting in a logic high level for VLPS_ON at the node 120.

First Illustrative Method

Figure 6:
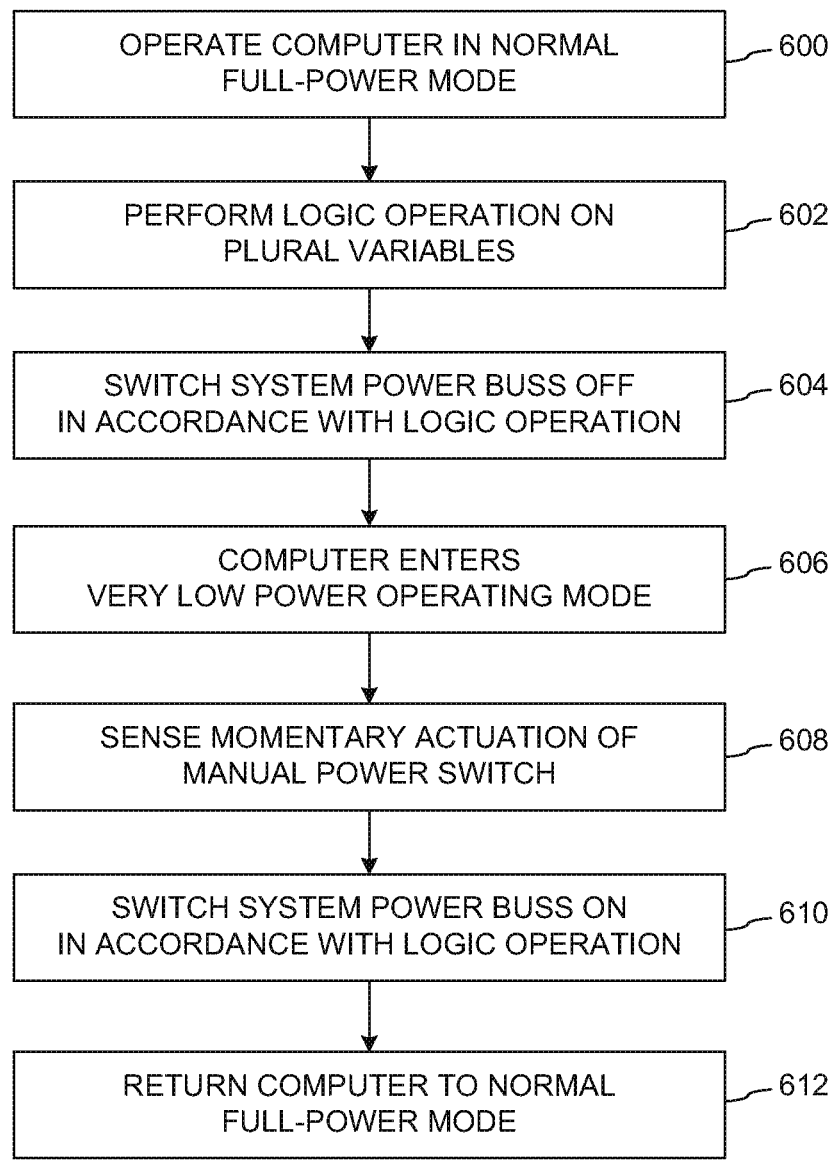
FIG. 6 is a flow diagram depicting a method in accordance with one embodiment.

Attention is now turned to FIG. 6, which depicts a flow diagram depicting a method according to one embodiment of the present teachings. The method of FIG. 6 includes particular operations and order of execution. However, other methods including other operations, omitting one or more of the depicted operations, and/or proceeding in other orders of execution can also be used according to the present teachings. Thus, the method of FIG. 6 is illustrative and non-limiting in nature. Reference is also made to FIG. 1 in the interest of understanding the method of FIG. 6.

At 600, a computer is operated at a normal, full-power mode. For purposes of non-limiting illustration, it is assumed that the computer 100 operates normally, executing one or more program codes, etc. It is further noted that the electronic switch 116 is in an electrically closed state so that electrical energy at the node 104 (PS_BUSS) is coupled to the node 118 (SYSPWR_BUSS). The switch control circuitry 122 drives the closed state of the electronic switch 116 by way of the output signal at the node 120 (VLPS_ON).

At 602, a logical operation is performed on a plurality of variables. For purposes of the ongoing illustration, it is assumed that logic circuitry (e.g., 400) within the switch control circuitry 122 performs a logic operation on the signals (logic variables) at the respective nodes 426, 114, 120, 124 and 126. It is further assumed that the output node 120 of the switch control circuitry 122 is changed (toggled) from logic low (logic 0) to logic high (logic 1) in accordance with the performed logic operation.

At 604, system power buss is switched OFF in accordance with the logic operation of 602 above. For purposes of the ongoing illustration, the electronic switch 116 is driven to an electrically open state. As a result, the node 118 (SYSPWR_BUSS) of the computer 100 is electrically isolated (or de-coupled) from the electrical energy at the node 104 (PS_BUSS).

At 606, the computer assumes a very low power operating mode. For purposes of the ongoing illustration, the computer 100 assumes a very low current-consuming operating mode. The system power buss 118 is effectively de-energized, as are most of the loads on the system board 108. In one embodiment, the computer 100 as a whole consumes less than one-half watt of electrical energy while in the very low power mode. However, electrical energy is still present at the nodes 104 and 119, respectively.

At 608, a momentary actuation of a manual power switch is sensed. For purposes of the ongoing illustration, the switch control circuitry 122 detects a manual actuation of the power button 112 by way of the signal at node 114. A corresponding logical operation is performed by the switch control circuitry 122 resulting in a change in the signal VLPS_ON at the node 120 from logic high to logic low.

At 610, the system power buss is switched ON in accordance with the logic operation of 608 above. For purposes of the ongoing illustration, the electronic switch 116 is driven to an electrically closed state. As a result, the node 118 (SYSPWR_BUSS) of the computer 100 is electrically re-connected to the electrical power at the node 104 (PS_BUSS).

At 612, the computer returns to a normal, full-power operating mode. For purposes of the ongoing illustration, the computer 100 resumes full-power operations with the system board 108 consuming energy as needed from the node 118. The system board 108, understood to include one or more microprocessors, etc. (not shown), starts up and returns to normal operations. Such normal operations are understood to continue until the very low power mode (or another sleep mode) is implemented.

The foregoing method is illustrative of any number of methods contemplated by the present teachings. In general, and without limitation, logic circuitry is configured to perform logical operation on a plurality of variables. These input variables correspond to, at least, the present state of: a manual switch; a power rail status signal; an input/output signal of a system board; a sleep-state signal of a load (computer); and the output signal of the logic circuitry.

The output signal from the logic circuitry drives an electronic switch that is electrically disposed between an output node of a power supply and one or more system board (loads) of a computer. The output signal changes state in accordance with a predetermined logical operation on the variables so as to drive the electronic switch into open and closed conditions. Such closed and open conditions of the electronic switch respectively couple and de-couple the system board(s) of the computer from an output node of the power supply.

The computer assumes a very low power mode of operation, consuming relatively little electrical energy, while the electronic switch is driven open. Conversely, the computer assumes (or can assume) normal, full-power operations while the electronic switch is driven closed.

In general, the foregoing description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

What is claimed is:

1. An apparatus, comprising:
   a control circuit to drive a control signal in accordance with a logical operation on a plurality of variables, at least some of the variables respectively corresponding to a present state of:
   a manual switch;
   a power rail status signal;
   an input/output signal of a computer system board;
   a sleep-state signal of a computer; and
   the control signal;
   an electronic switch to isolate a system power buss of a computer from a source of electrical potential in accordance with a first result state of the logical operation; and
   the electronic switch to couple the system power buss to the source of electrical potential in accordance with a second result state of the logical operation.

2. The apparatus according to claim 1, the control circuit further configured such that the logical operation on the plurality of variables is defined by:

$$\text{VLPS\_ON} \mathrel{+}= (!\,\text{SLP\_S5\#} * \text{VLPS\_GPIO} * \text{PWR\_RAIL}) +$$
$$(\text{VLPS\_ON} * PWRBTTN\# * !\,\text{PWR\_RAIL}) + (\text{VLPS\_ON} * \text{PWR\_RAIL})$$

wherein:
   VLPS_ON is the present state of the control signal;
   VLPS_ON+is the next state of the control signal;
   SLP_S5# is a computer sleep-state status signal;
   VLPS_GPIO is a general purpose input/output signal of a computer;
   PWR_RAIL is a power rail status signal of a computer;
   PWRBTTN# is a manual switch status signal;
   ! indicates a logical NOT operation;
   * indicates a logical AND operation; and
   +indicates a logical OR operation.

3. The apparatus according to claim 1, the system power buss electrically coupled to one or more system boards of a computer.

4. The apparatus according to claim 1, the source of electrical potential further defined by an output from a power supply.

5. The apparatus according to claim 1, the electronic switch electrically disposed between an output node of a computer power supply and a system power buss of a computer.

6. The apparatus according to claim 5, the system power buss of the computer being electrically isolated from the output node of the computer power supply while the electronic switch is in an electrically open state.

7. The apparatus according to claim 5, the computer including a power rail distinct from the system power buss.

8. The apparatus according to claim 1, the electronic switch including a field-effect transistor.

9. The apparatus according to claim 1, the control circuit further configured to:
cause and maintain an electrically open state of the electronic switch in accordance with the logical operation of the plurality of variables, the open state of the electronic switch corresponding to a very low power state of the apparatus; and
cause and maintain an electrically closed state of the electronic switch in response to a momentary activation of the manual switch by a user when the apparatus is in the very low power state.

10. The apparatus according to claim 1, the control circuit including at least ten discrete transistors of equivalent characteristics.

11. The apparatus according to claim 1, the control circuit not including any integrated circuit having two or more transistors.

12. The apparatus according to claim 1, the apparatus configured to consume not greater than zero-point-five watts of electrical energy from an external source while the electronic switch is in an electrically open state.

13. A method performed at least in part by an electronic circuit, comprising:
performing a logical operation on at least five variables;
electrically isolating a system power buss of a computer from a source of electrical potential in accordance with a first result state of the logical operation; and
electrically coupling the system power buss of the computer to the source of electrical potential in accordance with a second result state of the logical operation.

14. The method according to claim 13, the at least five variables respectively corresponding to a present state of: a manual switch status signal, a power rail status signal, a general purpose input/output signal of a computer, a sleep-state signal of the computer, and a switch control signal.

15. The method according to claim 13, the electrically isolating and the electrically coupling respectively performed by way of an electronic switch.

* * * * *

UNITED STATES PATENT AND TRADEMARK OFFICE
CERTIFICATE OF CORRECTION

| | | |
|---|---|---|
| PATENT NO. | : 8,806,237 B2 | Page 1 of 1 |
| APPLICATION NO. | : 13/387633 | |
| DATED | : August 12, 2014 | |
| INVENTOR(S) | : Robert C. Brooks et al. | |

It is certified that error appears in the above-identified patent and that said Letters Patent is hereby corrected as shown below:

On the Title page, in item (87), PCT Pub. No., in column 1, line 2, delete "Jun. 10, 2011" and insert -- Oct. 6, 2011 --, therefor.

Signed and Sealed this
Sixteenth Day of December, 2014

Michelle K. Lee
*Deputy Director of the United States Patent and Trademark Office*